United States Patent [19]

Imabayashi et al.

[11] Patent Number: 4,631,594

[45] Date of Patent: Dec. 23, 1986

[54] PROJECTION DEVICE

[75] Inventors: Koji Imabayashi; Hiroshi Kawamura, both of Toyonaka; Shigeru Takeuchi, Moriyama; Masayoshi Shinobu, Kyoto; Shinobu Kawajiri, Nagaokakyo, all of Japan

[73] Assignee: Mitsubishi Denki Kabushiki Kaisha, Tokyo, Japan

[21] Appl. No.: 743,678

[22] Filed: Jun. 11, 1985

[30] Foreign Application Priority Data

Jun. 12, 1984 [JP] Japan .............................. 59-122499

[51] Int. Cl.⁴ ............................................. H04N 5/74
[52] U.S. Cl. .................................. 358/231; 358/237; 358/60; 313/478
[58] Field of Search ................. 358/231, 237, 250, 60; 313/478, 473, 474

[56] References Cited

U.S. PATENT DOCUMENTS

| 4,034,398 | 7/1977 | Sheldrake et al. ............... 313/474 X |
| 4,405,949 | 9/1983 | Hockenbrock et al. ............ 358/237 |
| 4,511,927 | 4/1985 | Bauer ............................. 358/231 X |
| 4,525,745 | 6/1985 | Ghaem-Maghami et al. ..... 358/237 |
| 4,543,510 | 9/1985 | Chiba et al. ..................... 313/478 X |

Primary Examiner—John W. Shepperd
Assistant Examiner—E. Anne Toth
Attorney, Agent, or Firm—Birch, Stewart, Kolasch & Birch

[57] ABSTRACT

A projecton device wherein a viscous body of transparent liquid is inserted between a CRT and an enlarging projection lens, which comprises: a ring-shaped spacer for determining the positional relation between the CRT and the lens unit provided therebetween; a ring-shaped packing provided between the CRT and the lens of the lens unit at the internal side of the spacer; a thin film section having elasticity provided as part of the packing; and a space provided between the spacer and the thin film section of the packing.

7 Claims, 3 Drawing Figures

PROJECTION DEVICE

FIELD OF THE INVENTION

The present invention relates to a projection device.

BACKGROUND OF THE INVENTION

In a projection device of a projection type television receiver, there is commonly provided transparent liquid or viscous body having a light refractive index close to that of the glass between the lens and the CRT tube. This is provided so as to prevent the decrease in contrast caused by the video image light emitted from the CRT fluoresent screen which is reflected at the boundary between the air existing between the CRT and the lens, and the glass face surface of the CRT. This produces an advantageous increase in the luminance of the video image by the extent that the reflection is decreased.

At first, a prior art projection device is described with reference to FIG. 1:

A lens unit 1 is fixed to the bracket 4 which supports the whole device by a screw inserted through an opening of a fitting flange 2. A CRT 5 is positioned at the side of the lens 3 of the lens unit 1 via an O-ring 7. The CRT 5 is fixed to the bracket 4 by a screw inserted through an opening of the ear section 6. Transparent silicon gel 8, for example, provided at the inside of the O-ring 7.

The silicon gel 8 expands or contracts to change the volume thereof in accordance with its temperature. Accordingly, the lens 3 in contact with the silicon gel 8 in the lens unit 1 is loosely mounted so as to enable the movement of the lens in accordance with the volume variation of the silicon gel 8.

The prior art projection device under such a construction has the following drawbacks:

1. The relative positions of the lenses in the lens unit 1 change in accordance with the volume variation of the silicon gel 8, thereby leading to a deviation of the function of the lens unit 1 from an optimum point. This problem is likely to arise because the CRT 5 is usually heated when functioning.

2. It is difficult to fill the O-ring 7 completely with the silicon gel 8.

3. Although the setting of the distance between the lens 3 and the CRT 5 and the relative angle between the confronting surfaces require a high accuracy, it is generally difficult to ensure the positional accuracy of the fitting ear section 6 of the CRT 5. Accordingly, it is necessary to conduct a dimension inspection while fitting the fitting ear section 6 to the bracket 4, and to provide an adjustment such as inserting a washer between the bracket 4 and the fitting ear section 6.

As evident from the foregoing, there are problems in both function and construction aspects.

SUMMARY OF THE INVENTION

The present invention is directed to solving the problems pointed out above, and has for its object to provide a projection device of a projection type TV receiver capable of ensuring the optical possitional relationship by a simple construction.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to the present invention, there is provided a projection device wherein viscous body or transparent liquid is inserted between a CRT and an enlarging projection lens, which comprises: a ring-shaped spacer for determining the positional relation between the CRT and the lens unit provided therebetween; a ring-shaped packing provided between the CRT and the lens of the lens unit at the internal side of the spacer; a thin film section having elasticity provided at the packing; and a space provided between the spacer and the thin film section at the packing.

DETAILED DESCRIPTION OF THE PREFERRED EMBODIMENTS

Figure 1:
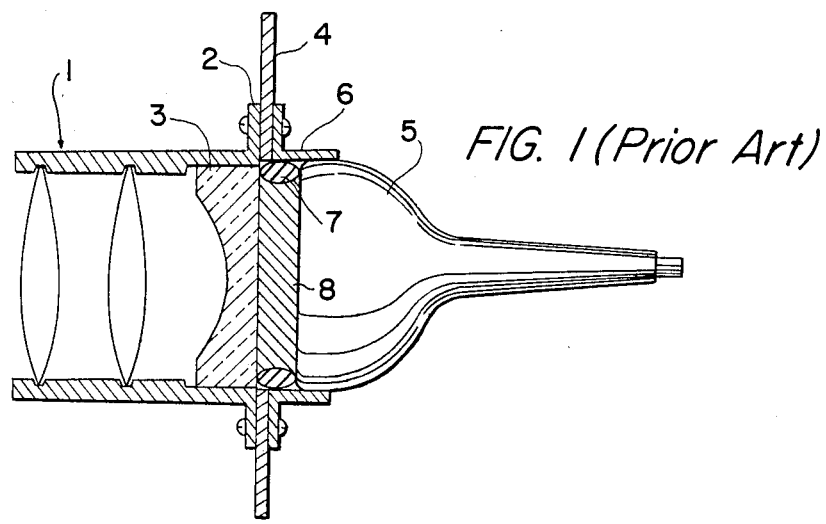
FIG. 1 is a cross-sectional view of a prior art projection device.
Figure 2:
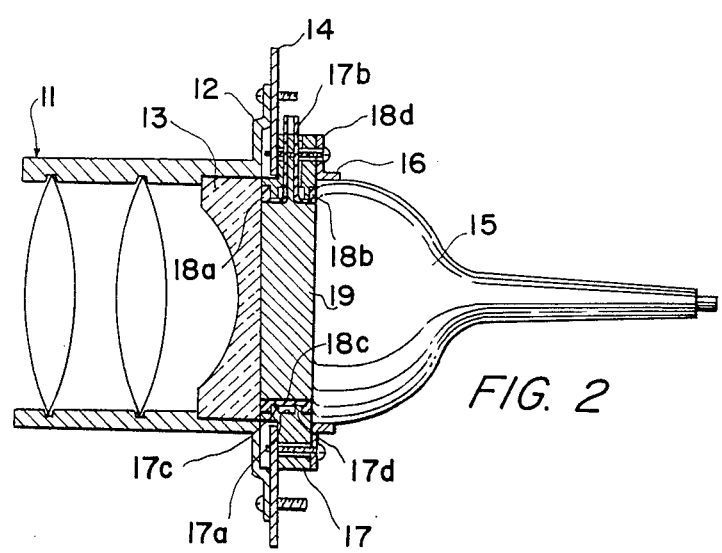
FIG. 2 is a cross-sectional view of a projection device as one embodiment of the present invention.
Figure 3:
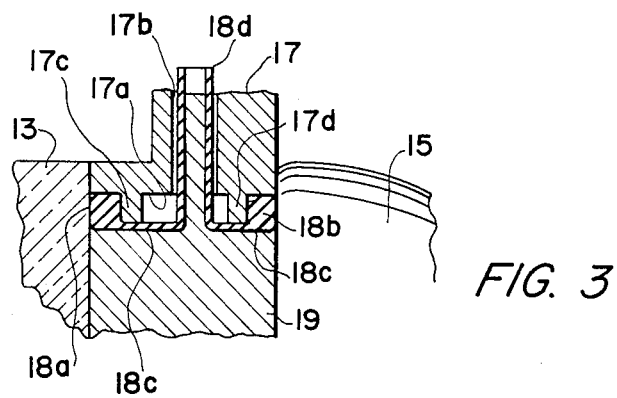
FIG. 3 is an enlarged cross-sectional view of a main portion of the device of FIG. 2.

In order to explain one embodiment of the present invention reference will be particularly made to FIGS. 2 and 3:

The reference numeral 11 designates a lens unit having a cylindrical body provided with a fitting flange 12 at its end, and a lens 13 fixed to the fitting flange side inner surface of the cylindrical body. The numeral 14 designates a fitting bracket to which the fitting flange 12 is fixed by a screw. The numeral 15 designates a CRT. The numeral 16 designates a fittiang ear section of the CRT 15. The numeral 17 designates a ring-shaped spacer having an internal groove 17a. The fitting ear section 16 of the CRT 15 is fixed to the fitting bracket 14 by a screw through the spacer 17. Ring-shaped packing means includes O-rings 18a, 18b made of an elastic material, which are provided between the internal side projection 17c of the spacer 17 and the lens 13 of the lens unit 11, and between the other internal side projection 17d of the spacer 17 and the glass face surface of the CRT 15, respectively. The numeral 18c designates a thin film having elasticity which is produced integrally between and with the O-rings 18a and 18b by using the same material as these rings. This thin film 18c is provided over the internal groove 17a located between the pair of internal side projections 17d and 17c to produce a space in the internal groove 17a. The numeral 18d designates a pipe-shaped port section provided at the thin film 18c of the ring-shaped packing means and is inserted through an opening 17b of the spacer 17. The numeral 19 designates silicon gel inserted between the lens 13 and the CRT 15 through the port section 18d. This port section 18d may be opened after the silicon gel 19 is injected, or it may be closed thereafter.

The construction method of this device is described in the following:

The fitting flange 12 of the lens unit 11 is fixed to the fitting bracket 14 by a screw, and the CRT 15 is fixed thereto with the glass face surface thereof confronting the lens 13 of the lens unit 11. During this fitting operation, the spacer 17 is held between the CRT 15 and the lens 13, and a screw is inserted through the fitting ear section 16 and the spacer 17 to fasten the elements 16 and 17 to the bracket 14.

The O-rings 18a and 18b are provided at the both sides of the spacer 17, respectively, and the O rings 18a and 18b are adhered closely to the spacer 17 and the lens 13, and to the spacer 17 and the glass face surface of the CRT 15, respectively.

As, the two O-rings 18a and 18b are connected with each other by a thin film 18c produced integrally with these rings. A silicon gel 19 is injected into the ring-shaped packing means through an injection port section 18d provided at a portion of the thin film 18c.

During operation of the CRT, when the silicon gel 19 expands by the heating of the CRT 15 so that the thin film 18c surrounding the silicon gel 19 is pushed to the outside by the increase in the silicon gel volume, the thin film 18c expands into the internal groove 17a of the spacer so that there is no increase in the internal pressure and no movement of the lens 13.

The distance between the lens 13 and the CRT 15 is held constant by the spacer 17, thereby resulting in an efficient arrangement that does not require a troublesome adjustment.

As evident from the foregoing, a required optical positional relation between the lens and the CRT is obtained, and a troublesome adjustment is rendered unnecessary by the disclosed combination of components. Furthermore, the increase of the internal pressure in the packing in response to a temperature variation can be handled with no influence on the optical system, thereby resulting in no deterioration of performance.

In the illustrated embodiment, the O-rings and the thin film are integrally produced together of the same material, but these may be made separately from each other and fixed together. The groove in the internal surface of the spacer may be produced in segments, rather than as a complete circle.

As described above, according to the present invention, the positions of the lens unit and the CRT are determined by a spacer, and a thin film is produced at the packing so as to absorb the increase of the pressure caused by the thermal expansion of the transparent liquid or the viscous body by a transformation of the thin film. This leads to an easy construction and an enhancement of the function of the device.

What is claimed is:

1. A projection device which comprises:
   a CRT having a glass face surface and a fitting ear section;
   a fitting bracket attached to said fitting ear section with a space therebetween;
   a spacer having a ring-shaped body located in said space and having an internal groove in said body;
   ring-shaped packing means, including an elastic thin film section contacting the internal surface of said spacer and covering said groove for providing a space in said groove of said spacer;
   a lens unit having a cylindrical body and a fitting flange at one end thereof fixed to said fitting bracket;
   a lens fixed within said cylindrical body adjacent said fitting flange and spaced from and confronting said CRT glass face surface,
   said ring-shaped packing means extending from said lens to said CRT glass face surface; and
   a transparent means having a light refractive index close to that of said CRT glass face for filling the space between said glass face surface of said CRT and said lens of said lens unit.

2. A projection device as defined in claim 1, wherein said transparent means is a liquid body.

3. A projection device as defined in claim 1, wherein said transparent means is a viscous body.

4. A projection device as defined in claim 1, wherein said spacer has a first and a second internal side projection which produces said internal groove therebetween, said packing means has a first packing portion having elasticity and having a thickness larger than that of said thin film section which is inserted between said lens of said lens unit and said first internal side projection, and a second packing portion having elasticity and having a thickness larger than that of said thin film section which is inserted between said glass face surface of said CRT and said second internal side projection.

5. A projection device as defined in claim 1, wherein said spacer has an opening through its inner surface and its outer surface at a portion thereof, and said packing means has a pipe-shaped port section inserted through said opening to reach the inside of said packing means.

6. A projection device as defined in claim 1, wherein said spacer has a first and a second internal projection which produces said internal groove therebetween and an opening through its inner surface and its outer surface at a portion thereof, and said packing means has a first packing portion having elasticity and having a thickness larger than that of said thin film section which is inserted between said lens of said lens unit and said first internal side projection, a second packing portion having elasticity and having a thickness larger than that of said thin film section which is inserted between said glass face surface of the CRT and said second internal side projection, and a pipe-shaped port section inserted through said opening to reach the inside of said packing means.

7. A projection device as defined in claim 6, wherein said thin film section, said first and said second packing portions, and said port section are integrally formed together of an elastic material.

* * * * *